United States Patent
Wang et al.

(10) Patent No.: US 12,518,441 B2
(45) Date of Patent: Jan. 6, 2026

(54) IMAGE PROCESSING METHOD AND APPARATUS, ELECTRONIC DEVICE AND COMPUTER READABLE MEDIUM

(71) Applicant: BEIJING ZITIAO NETWORK TECHNOLOGY CO., LTD., Beijing (CN)

(72) Inventors: Jingye Wang, Beijing (CN); Qi Li, Beijing (CN); Fengwei Wang, Beijing (CN); Kaixiang Lei, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 278 days.

(21) Appl. No.: 18/250,718

(22) PCT Filed: Sep. 17, 2021

(86) PCT No.: PCT/CN2021/118950
§ 371 (c)(1),
(2) Date: Apr. 26, 2023

(87) PCT Pub. No.: WO2022/089087
PCT Pub. Date: May 5, 2022

(65) Prior Publication Data
US 2023/0401764 A1    Dec. 14, 2023

(30) Foreign Application Priority Data

Oct. 27, 2020  (CN) .......................... 202011163822.3

(51) Int. Cl.
*G06T 11/00* (2006.01)
*G06F 3/01* (2006.01)
(Continued)

(52) U.S. Cl.
CPC .............. *G06T 11/001* (2013.01); *G06T 5/50* (2013.01); *G06T 2207/20221* (2013.01)

(58) Field of Classification Search
CPC ..................... G06T 11/001; G06T 5/50; G06T 2207/20221; G06F 3/01; G06F 3/04847;
(Continued)

(56) References Cited

U.S. PATENT DOCUMENTS 7,381,257 B2 *  6/2008  Takayama ............ C09D 11/322
                                                    106/31.86
7,571,969 B2 *  8/2009  Kusunoki .............. C09D 11/30
                                                    347/100
(Continued)

FOREIGN PATENT DOCUMENTS

| CN | 102254333 A |   | 11/2011 |            |
|----|-------------|---|---------|------------|
| CN | 103150019 A | * | 6/2013  | G06K 9/68  |

(Continued)

OTHER PUBLICATIONS

Chu, N. S. et al., "MoXi: Real-Time Ink Dispersion in Absorbent Paper," ACM Transactions on Graphics (TOG), vol. 24, No. 3, Jul. 1, 2005, 1 page.
(Continued)

*Primary Examiner* — Wesner Sajous
(74) *Attorney, Agent, or Firm* — Alleman Hall & Tuttle LLP

(57) ABSTRACT

The present disclosure provides an image processing method and apparatus, an electronic device and a computer readable medium, and relates to the technical field of image processing. The method comprises: on the basis of input information, generating a first image in which a fluid element is in an initial state; on the basis of the first image, determining a flow state of the fluid element by means of a fluid simulation algorithm to obtain a second image; and on the
(Continued)

Generate a first image of a fluid element in an initial state based on input information, where the initial state of the fluid element is determined based on the input information — S101

Determine, based on the first image and by using a fluid simulation algorithm, a flow state of the fluid element to obtain a second image — S102

Determine, based on the second image, a stop state of the fluid element to obtain a third image — S103 basis of the second image, determining a stop state of the fluid element to obtain a third image.

16 Claims, 3 Drawing Sheets

(51) Int. Cl.
  *G06T 5/40* (2006.01)
  *G06T 5/50* (2006.01)
(58) Field of Classification Search
  CPC .......... G06F 3/0481; H04N 1/54; H04N 1/60; H04N 1/6058; G09G 5/02; G09G 5/026; G09G 5/06; G09G 2320/0271–0276; G09G 2320/06; G09G 2320/066; E21B 43/26; E21B 43/267; E21B 47/06
  See application file for complete search history.

(56) References Cited

U.S. PATENT DOCUMENTS

| | | | | |
|---|---|---|---|---|
| 7,629,400 | B2 * | 12/2009 | Hyman | B41M 5/36 524/106 |
| 8,296,668 | B1 * | 10/2012 | Song | G09G 5/026 715/764 |
| 2012/0072828 | A1 | 3/2012 | Barkman et al. | |

FOREIGN PATENT DOCUMENTS

| | | |
|---|---|---|
| CN | 103440417 A | 12/2013 |
| CN | 108162673 A | 6/2018 |
| CN | 112581555 A | 3/2021 |

OTHER PUBLICATIONS

China National Intellectual Property Administration, Office Action Issued in Application No. 202011163822.3, Jun. 24, 2024, 17 pages.
Chu, N. S-H. et al., "MoXi: Real-Time Ink Dispersion in Absorbent Paper," ACM Transaction on Graphics, vol. 24, No. 3, Aug. 2005, 8 pages.
China National Intellectual Property Administration, International Search Report Issued in Application No. PCT/CN2021/118950, Dec. 17, 2021, WIPO, 4 pages.
China National Intellectual Property Administration, Second Office Action for Chinese Application No. 202011163822.3, mailed Nov. 4, 2024, 16 pages.
China National Intellectual Property Administration, Written Opinion for International Application No. PCT/CN2021/118950, mailed Dec. 17, 2021, 8 pages.

* cited by examiner

IMAGE PROCESSING METHOD AND APPARATUS, ELECTRONIC DEVICE AND COMPUTER READABLE MEDIUM

CROSS REFERENCE OF RELATED APPLICATION

The present application is the national phase of International Patent Application No. PCT/CN2021/118950, titled "IMAGE PROCESSING METHOD AND APPARATUS, ELECTRONIC DEVICE AND COMPUTER READABLE MEDIUM", filed on Sep. 17, 2021, which claims priority to Chinese Patent Application No. 202011163822.3, titled "IMAGE PROCESSING METHOD AND APPARATUS, ELECTRONIC DEVICE AND COMPUTER READABLE MEDIUM", filed on Oct. 27, 2020 with the China National Intellectual Property Administration, all of which are incorporated herein by reference in their entireties.

FIELD

The present disclosure relates to the technical field of image processing, and in particular to an image processing method, an image processing apparatus, an electronic device, and a computer-readable medium.

BACKGROUND

With the improvement of image processing technologies, the image processing ability of computers is increasingly stronger. The simulation of ink painting on computers enables users to draw ink paintings by using the computer.

In the existing simulation of ink painting, it is necessary to simulate the phenomena such as ink splashing, diffusion, blending, solidify, evaporation, downward flow by gravity, and formation of specific contours due to paper materials of ink pigments on paper, which requires a computer with high computing power. At present, the simulation effect on the computer is poor, and the simulation on the mobile terminal fails to have a technical solution for making a response. Nowadays, increasingly mobile terminals are used. Therefore, a technology that simulates ink painting on the mobile terminal is desirable.

It can be seen that in the conventional technology, the technology for simulating ink painting requires a computer with strong computing power, and there is no corresponding simulation technology for mobile terminals.

SUMMARY

The purpose of the present disclosure is to at least solve one of the above technical defects, especially the technical defect that the existing simulation of ink painting products are applicable to users who have painting foundation, resulting in a limited range of users.

In a first aspect, an image processing method is provided. The method includes: generating a first image of a fluid element in an initial state based on input information, where the initial state of the fluid element is determined based on the input information; determining, based on the first image and by using a fluid simulation algorithm, a flow state of the fluid element to obtain a second image; and determining, based on the second image, a stop state of the fluid element to obtain a third image.

In a second aspect, an apparatus for drawing a painting based on user interaction is provided. The apparatus includes: a first image generation module, a second image generation module and a third image generation module. The first image generation module is configured to generate a first image of a fluid element in an initial state based on input information. The initial state of the fluid element is determined based on the input information. The second image generation module is configured to determine, based on the first image and by using a fluid simulation algorithm, a flow state of the fluid element to obtain a second image. The third image generation module is configured to determine, based on the second image, a stop state of the fluid element to obtain a third image.

In a third aspect, an electronic device is provided. The electronic device includes: one or more processors, a memory, and one or more application programs. The one or more application programs are stored in the memory and configured to be executed by the one or more processors to perform the method for drawing a painting based on user interaction.

In a fourth aspect, a computer-readable storage medium is provided. The readable medium stores at least one instruction, at least one program, code set or instruction set. The at least one instruction, at least one program, code set or instruction set is loaded and executed by a processor to implement the image processing method.

In the embodiment of the present disclosure, input information is received. A first image of a fluid element in an initial state is generated. A flow state of the fluid element is determined based on the first image and a fluid simulation algorithm, to generate a second image. A stop state of the fluid element is determined based on the second image, to obtain a third image. The image processing is divided into three layers. The initial state, the flow state and the stop state of the fluid element are described separately, so that the simulation of flowing and solidification of fluid is more realistic. In the field of simulation of ink painting, the simulation effect is more realistic and it is easy for users to learn.

BRIEF DESCRIPTION OF THE DRAWINGS

In order to illustrate the technical solutions in the embodiments of the present disclosure more clearly, the drawings for illustrating the description of the embodiments of the present disclosure are briefly introduced below.

The above and other features, advantages and aspects of embodiments of the present disclosure will become more apparent with reference to the following detailed description in conjunction with the drawings. Throughout the drawings, the same or similar reference numerals denote the same or similar elements. It should be understood that the drawings are illustrative and that components and elements are unnecessarily drawn to scale.

DETAILED DESCRIPTION

Figure 1:
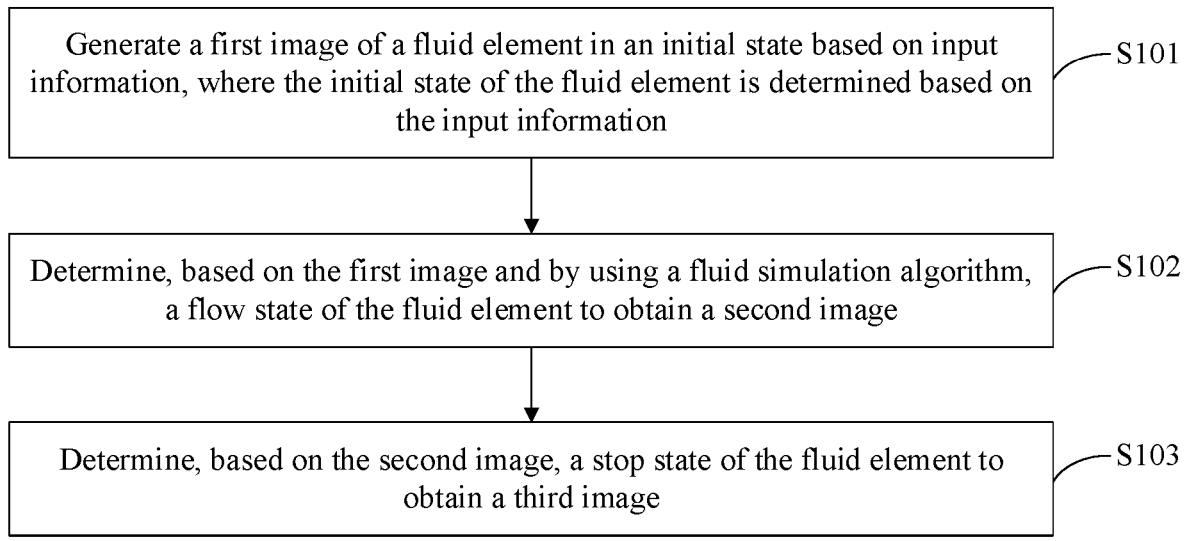
FIG. 1 is a schematic flowchart illustrating an image processing method according to an embodiment of the present disclosure.

Embodiments according to the present disclosure will be described in more detail below with reference to the drawings. Although some embodiments according to the present disclosure are shown in the drawings, it should be understood that the present disclosure may be implemented in various forms and should not be construed as limited to the embodiments set forth herein. Instead, these embodiments are provided for a thorough and complete understanding of the present disclosure. It should be understood that the drawings and embodiments according to the present disclosure are only for illustration rather than intended to limit the protection scope of the present disclosure.

It should be understood that the steps described in the method embodiments according to the present disclosure may be performed in a different order and/or performed in parallel. Furthermore, method embodiments may include additional steps and/or illustrated steps may not be performed. The scope according to the present disclosure is not limited in this regard.

Herein, the term "including" and its variants are open-ended inclusion, i.e., "including but not limited to". The term "based on" is "based at least in part on". The term "an embodiment" indicates "at least one embodiment." The term "another embodiment" indicates "at least one additional embodiment". The term "some embodiments" indicates "at least some embodiments". Relevant definitions of other terms are given in the description below.

It should be noted that concepts such as "first" and "second" herein are for distinguishing apparatuses, modules or units only, neither defining that these apparatuses or units must be different from each other nor defining the order or interdependence of functionalities performed by these apparatuses, modules or units.

It should be noted that the determiners such as "a" and "a plurality" herein are illustrative rather than restrictive. It should be understood by those skilled in the art that unless the context clearly dictates otherwise, "a" and "a plurality" should be construed as "one or more".

The name of a message or information exchanged between apparatuses according to the embodiments of the present disclosure are only for illustrative purpose rather than limiting the scope of the message or information.

The method and apparatus for drawing a painting based on user interaction, the electronic device and the computer-readable storage medium according to the present disclosure aim to solve the above technical problems in the conventional technology.

The technical solution of the present disclosure and how the technical solution of the present disclosure solves the above technical problems will be described in detail below with embodiments. The following embodiments may be combined with each other, and the same or similar concepts or processes may not be repeated in some embodiments. The embodiments of the present disclosure will be described below with reference to the accompanying drawings.

A method for drawing a painting based on user interaction is provided according to an embodiment of the present disclosure. As shown in FIG. 1, the method includes the following steps S101 to S103.

In step S101, a first image of a fluid element in an initial state is generated based on input information. The initial state of the fluid element is determined based on the input information.

In step S102, a flow state of the fluid element is determined based on the first image and a fluid simulation algorithm, to obtain a second image.

In step S103, a stop state of the fluid element is determined based on the second image, to obtain a third image.

According to the embodiment of the present disclosure, an image processing method is provided, and is mainly applied in the technical field of simulation of ink painting. It is equivalent to providing a technology for simulating ink painting, in which an ink painting is generated based on user operation, and the technology is mainly applied to mobile terminals, such as mobile phones and tablet computers. Needless to say, the image processing method according to this embodiment may also be applied to terminals such as computers.

In the embodiment of the present disclosure, the input information refers to the information inputted by a user through the mobile terminal, and based on which the initial state of the fluid element is determined. The fluid element refers to an element for drawing the ink painting, such as water, ink, and the like. The input information may include a selection of the fluid element by the user, such as a ratio of water to ink, a color of ink, and also includes a trajectory drawn by the user on the user terminal. Optionally, the trajectory may be a track drawn by the user on a touch screen of the user terminal by touching the screen.

A specific embodiment is taken as an example for convenience of description. The image processing method according to the present disclosure is applied to the simulation of ink painting. The user draws an ink painting on a mobile terminal such as a tablet computer. The mobile terminal receives input information, and generates a first image of the fluid element in an initial state based on the input information. The input information may include selection information of the fluid element and trajectory information. The selection information of the fluid element is utilized to determine a type of the fluid element, a color of the fluid element, a drawing radius, and the like. Based on this input information, the initial state of the fluid element is determined. The initial state of the fluid element refers to a state in which the fluid element initially displayed based on the input information by the user. Optionally, the fluid element is displayed on the trajectory drawn by the user, to generate the first image. Based on the first image, a flow state of the fluid element is determined according to a preset fluid simulation algorithm. The fluid simulation algorithm simulates flowing of a fluid. The fluid element generates a flow trajectory as it flows. The second image is generated based on the flow trajectory. Based on the second image, the stop state of the fluid element is determined, and then the third image is generated. The water in the fluid element evaporates at a certain evaporation coefficient during the flowing. The ink in the fluid element is eventually solidified and the third image is formed based on the solidification of the ink. Finally, a simulated image of the ink painting is generated by combining the first image, the second image and the third image at the same moment, and the generated simulated image is displayed.

In the embodiment of the present disclosure, input information is received. A first image of a fluid element in an initial state is generated. A flow state of the fluid element is determined based on the first image and a fluid simulation algorithm, to generate a second image. A stop state of the fluid element is determined based on the second image, to obtain a third image. The image processing is divided into three layers. The initial state, the flow state and the stop state of the fluid element are described separately, so that the simulation of flow and solidification of fluid is more realistic. In the field of simulation of ink painting, the simulation effect is more realistic and it is easy for users to learn.

In a possible implementation of the embodiment of the present disclosure, the fluid element includes: a water element and/or an ink element.

The stop state of the water element indicates that the water element evaporates completely. The stop state of the ink element indicates that the ink element is solidified.

In an embodiment of the present disclosure, the fluid element may be water or ink. Optionally, the fluid element is composed of water and ink in a certain ratio. This ratio is determined by the user.

In the embodiment of the present disclosure, the stop state of the fluid element is determined based on the second image. The stop state of the water element indicates that the water evaporates based on a certain evaporation coefficient. The stop state of the ink element indicates that the ink element is solidified. The solidification of the ink element is to simulate the state that the ink element dries up on the paper and no longer flows. The water element evaporates exponentially in a preset ratio. When the water element in a unit area is lower than a certain value, it is determined that the water element in the unit area completely evaporates, and the water element in the unit area is no longer displayed. During the flowing process, the ink element is solidified on the flow trajectory according to a certain ratio, until the ink element per unit area is lower than a certain value, the ink element no longer flows.

In the embodiment of the present disclosure, the stop state of the water element and the ink element in the fluid element is simulated, and the evaporation of water and the drying of ink in the ink painting are simulated, and the simulation effect is good.

Figure 2:
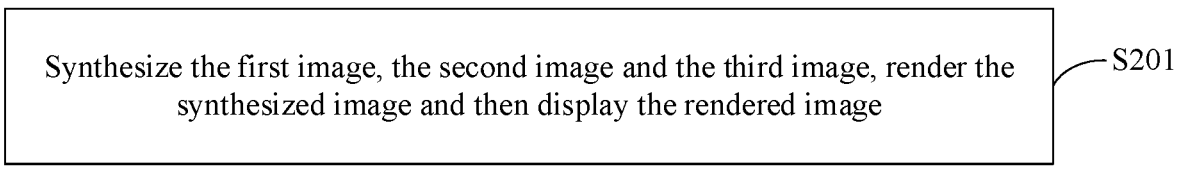
FIG. 2 is a schematic flowchart illustrating a method for displaying an image according to an embodiment of the present disclosure.

In a possible implementation of the embodiment of the present disclosure, as shown in FIG. 2, the method further includes the following step S201.

In step S201, the first image, the second image and the third image are synthesized, and the synthesized image is rendered and then displayed.

In the embodiment of the present disclosure, before displaying the first image, the second image and the third image, the first image, the second image and the third image are synthesized, and the synthesized image is rendered and then displayed.

Figure 3:
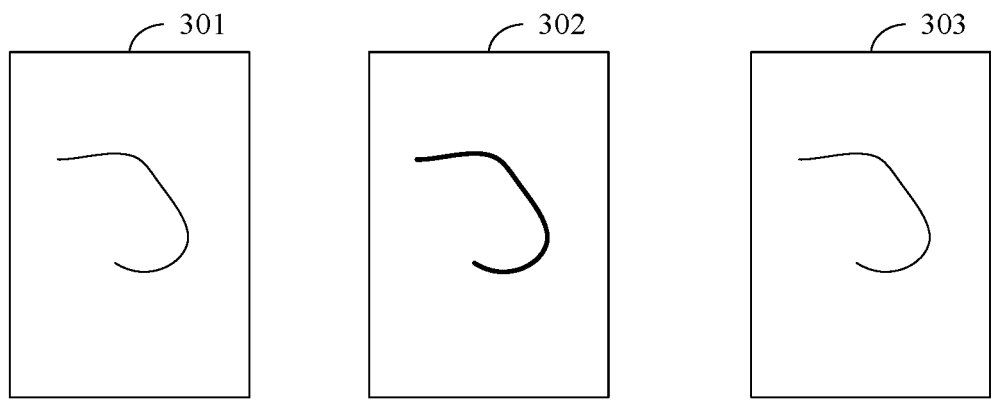
FIG. 3 is a schematic diagram illustrating three images according to an embodiment of the present disclosure.

In the embodiment of the present disclosure, as shown in FIG. 3, the first image 301, the second image 302 and the third image 303 are all dynamic image layers. The three images at a synthesis comment are synthesized. The three images refer to the first image, the second image and the third image that have been formed at corresponding moments. For convenience of description, a specific embodiment is taken as an example. When synthesizing the images at the current moment, the first image at the current moment is the directly selected image at the current moment. The second image at the current moment is formed based on a second image at a previous moment and a first image at the previous moment. For example, the second image at the previous moment is generated based on the first image at the previous moment. In this case, the fluid element is still flowing, and the second image is generated continually based on the first image. The second image at the current moment is obtained based on the second image at the previous moment and the second image generated based on the first image at the current moment. Likewise, the third image is formed based on the third image at the previous moment and the third image generated based on the second image at the current moment. The images formed at the same moment are synthesized, and the synthesized image is rendered and then displayed.

In the embodiment of the present disclosure, the first image, the second image and the third image at the same moment are synthesized, and the synthesized image is rendered and then displayed, thereby displaying the simulation effects of the ink painting in real time.

In a possible implementation of the embodiment of the present disclosure, the fluid simulation algorithm is the Lattice Boltzmann Equation.

In the embodiment of the present disclosure, the fluid simulation algorithm is an LBE (Lattice Boltzmann Equation) algorithm. This algorithm is utilized to simulate the flow of the fluid element.

Figure 4:
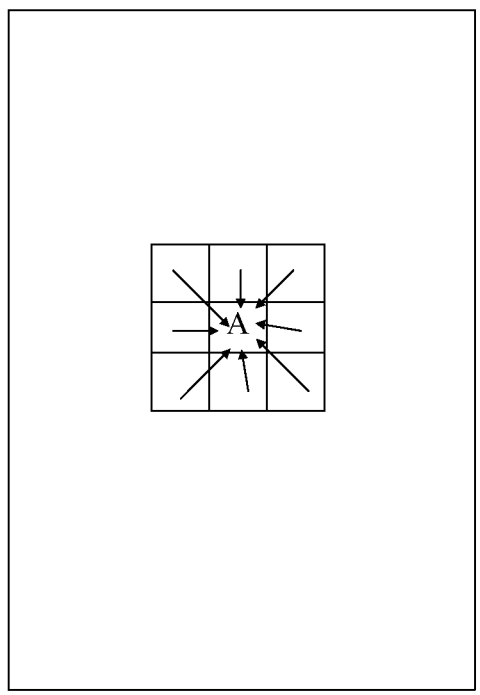
FIG. 4 is a schematic diagram illustrating flowing of a fluid element according to an embodiment of the present disclosure.

In the embodiment of the present disclosure, the LBE algorithm is utilized to simulate the flow of the fluid element. Each layer is divided into grids. The fluid element in each lattice flows into an adjacent grid. Fluid elements in different grids collide when flowing into the same grid. A flowing speed and a flowing direction of the fluid element in a lattice after collision are determined by flowing speeds and flowing directions of the fluid elements flowing into the grid. Optionally, a vector of the fluid element in the lattice after the collision is a sum of vectors of the fluid elements flowing into the grid. For example, as shown in FIG. 4, the vectors of fluid flowing into a lattice A are (1, 0), (0.5, 0.5), (0, 0.5), (−0.5, 0.5), (−1, 0), (−0.5, −0.8), (0, −1), (0.5, 0.8). After the fluid element collide in the lattice A, the vector of the fluid element in the lattice is (0, 0.5). This vector represents a flowing speed and a flowing direction of the fluid element in the grid.

In the embodiment of the present disclosure, the LBE algorithm is utilized to simulate the flow of the fluid element, so that the flow of water and ink on paper can be truly simulated, and the simulation effects of ink painting are better.

In a possible implementation of the embodiment of the present disclosure, the lattice in the Lattice Boltzmann Equation has a resistance coefficient for the flowing of the fluid element.

In the embodiment of the present disclosure, in the process of simulating the flow of the fluid element by utilizing the LBE algorithm, a damping coefficient is added to the lattice in order to simulate the resistance of paper. Optionally, the damping coefficient may be obtained by scanning the paper, and stored in the lattice in a preset texture format. Each lattice stores a damping coefficient. As the fluid element flows through the grid, the flowing speed is reduced in proportion to the damping coefficient until the fluid element stops flowing.

In the embodiment of the present disclosure, a damping coefficient is added to the lattice to simulate the resistance of paper, so as to ensure that the fluid element does not flow all the time, and the simulation effect is more realistic.

In a possible implementation of the embodiment of the present disclosure, in the Lattice Boltzmann algorithm, an attribute value of the lattice is calculated based on a corrected flowing speed of the fluid element. The corrected flowing speed is obtained by correcting an average flowing speed of the fluid element based on a correction coefficient of the fluid element. The correction coefficient is determined based on density of the fluid element.

In the embodiment of the present disclosure, in the process of simulating the flow of the fluid element by utilizing the LBE algorithm, in order to ensure that the fluid flows from a place without water to a place with water, the fluid density in some grids are negative in the standard LBE algorithm, resulting in non-physical phenomena. For this reason, in the LBE algorithm according to the embodiment of the present disclosure, an attribute value of the lattice in an equilibrium state is calculated based on the corrected flowing speed of the fluid element.

In the embodiment of the present disclosure, the corrected flowing speed is obtained by correcting the average flowing speed of the fluid element based on the correction coefficient of the fluid element. The correction coefficient is determined based on the density of the fluid element. The attribute value in the equilibrium state of the lattice refers to a flow attribute of the fluid element in the lattice in the equilibrium state, and is calculated as follows.

$$d_i = w_i \{ \rho_1 + \varepsilon \rho_2 [\alpha_1 u_i \cdot v + \alpha_2 (u_i \cdot v)^2 + \alpha_3 v \cdot v] \}$$

i is an integer from 1 to 9, and indicates nine grids adjacent to a current grid. $w_i$ is a preset parameter. In a case of calculation performed on the current grid, $w_i$ is equal to 0.444. In a case of calculation performed on a lattice above, below, in the left of, or in the right of the current grid, $w_i$ is equal to 0.111. In a case of calculation performed on lattice in the upper left, the lower left, the upper right or the lower right of the current grid, $w_i$ is equal to 0.028. $\rho_1$ represents the current fluid density. $\rho_2$ represents the average fluid density. $u_i$ represents a vector difference between a lattice i and the current lattice in position. v is the fluid velocity of the fluid element in the current grid. $\alpha_1$, $\alpha_2$ and $\alpha_3$ are three preset parameters, and are equal to 3, 4.5 and −1.5 respectively. The correction coefficient ε is calculated as follows.

$$\varepsilon = (3 - 2t) \cdot t^2$$

$$t = \max(\min(2\rho_1 / 1) / 0)$$

In the embodiment of the present disclosure, the greater the density of the fluid element, the greater the correction coefficient.

In the embodiment of the present disclosure, in the calculation of the attribute of the lattice in the equilibrium state, the flowing speed of the fluid is corrected based on the correction coefficient, so as to ensure that no non-physical phenomenon occurs in the simulation of the fluid calculation.

In a possible implementation of the embodiment of the present disclosure, the fluid element includes a water element and an ink element, and a flow state of the ink element is determined based on a flow state of the water element.

In the embodiment of the present disclosure, the fluid element may be composed of water and ink according to a certain ratio. When the fluid element is flowing, the flow state of the ink element is determined based on the flow state of the water element. Optionally, when the water element evaporates and is in a stop state, the ink element is correspondingly solidified and stops flowing.

In a possible implementation of the embodiment of the present disclosure, the input information is determined based on a target object recognized in an input image.

In an embodiment of the present disclosure, the first image of the fluid element is determined based on input information, and the input information may be determined based on a target object recognized in the input image. In an embodiment, based on the image data inputted by the user, the target object in the image data is determined. Optionally, the image data may be a picture or a video, and optionally a video showing a human. A hand of the human is determined as the target object in this video. The input information is determined based on a motion of the hand of the human. Optionally, the fluid element may be displayed on the trajectory along which the hand moves.

In the embodiment of the present disclosure, the first image of the fluid element is determined based on the target object in the input image, increasing the usage scenarios of image processing.

In a possible implementation of the embodiment of the present disclosure, the input information is determined based on a drawing operation by the user.

In the embodiment of the present disclosure, the input information is determined based on a drawing operation by the user, and optionally a drawing operation performed by the user on a painting drawing interface. The painting drawing interface may be an interface displayed on a display screen that supports touch-screen clicking, such as an interface displayed on a touch-screen mobile phone, an interface displayed on a touch-screen tablet computer, or an interface displayed on an ordinary display screen. The display may be connected to external devices such as a mouse and a keyboard. The user may perform the painting drawing operation through the external devices. The painting drawing operation may be the operation of the user clicking to start an APP, or the operation of the user clicking a painting drawing function in the APP, or a voice operation, a gesture operation and the like by the user. The drawing operation may include an operation performed by the user on the painting drawing interface, such as selecting a paint, drawing, and the like. Based on this drawing operation, the composition, usage and display area of the fluid element are determined.

In the embodiment of the present disclosure, the first image of the fluid element is determined based on the drawing operation by the user, so that the user can freely operate, and the degree of freedom of drawing is large.

In the embodiment of the present disclosure, input information is received. A first image of a fluid element in an initial state is generated. A flow state of the fluid element is determined based on the first image and a fluid simulation algorithm, to generate a second image. A stop state of the fluid element is determined based on the second image, to obtain a third image. The image processing is divided into three layers. The initial state, the flow state and the stop state of the fluid element are described separately, so that the simulation of flow and solidification of fluid is more realistic. In the field of simulation of ink painting, the simulation effect is more realistic and it is easy for users to learn.

Figure 5:
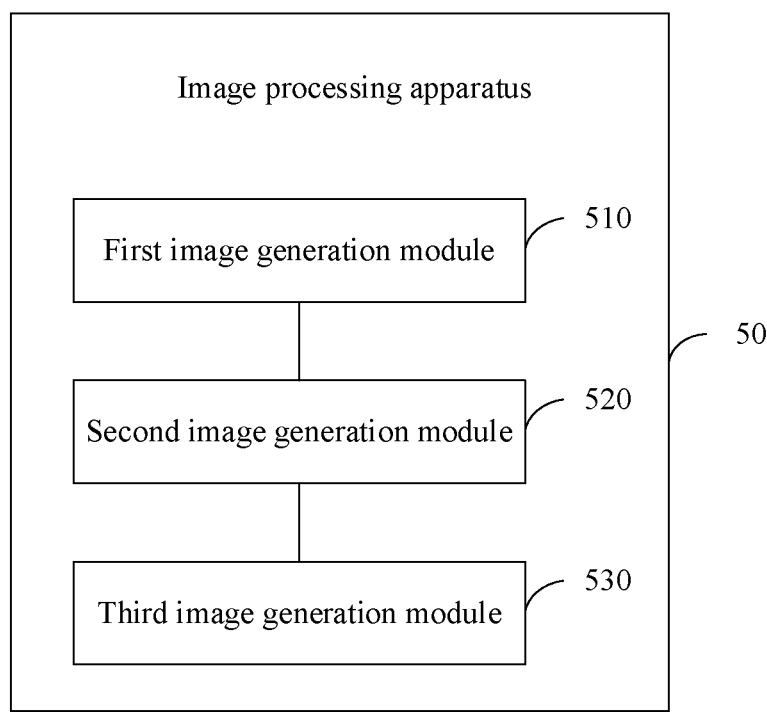
FIG. 5 is a schematic structural diagram illustrating an image processing apparatus according to an embodiment of the present disclosure.

An image processing apparatus is provided according to an embodiment of the present disclosure. As shown in FIG. 5, the image processing apparatus 50 includes a first image generation module 510, a second image generation module 520, and a third image generation module 530.

The first image generation module 510 is configured to generate a first image of a fluid element in an initial state based on input information. The initial state of the fluid element is determined based on the input information.

The second image generation module 520 is configured to determine, based on the first image and by using a fluid simulation algorithm, a flow state of the fluid element to obtain a second image.

The third image generation module 530 is configured to determine, based on the second image, a stop state of the fluid element to obtain a third image.

Optionally, the fluid element includes: a water element and/or an ink element.

The stop state of the water element indicates that the water element evaporates completely. The stop state of the ink element indicates that the ink element is solidified.

Optionally, the apparatus further includes a display module. The display module is configured to synthesize the first image, the second image and the third image, render the synthesized image and display the rendered image.

Optionally, the fluid simulation algorithm is the Lattice Boltzmann Equation.

Optionally, a lattice in the Lattice Boltzmann Equation has a resistance coefficient for the flowing of the fluid element.

Optionally, an attribute value of the lattice in the Lattice Boltzmann algorithm is calculated based on a corrected flowing speed of the fluid element. The corrected flowing speed is obtained by correcting an average flowing speed of the fluid element based on a correction coefficient of the fluid element. The correction coefficient is determined based on density of the fluid element.

Optionally, the greater the density of the fluid element, the greater the correction coefficient.

Optionally, the fluid element includes a water element and an ink element, and a flow state of the ink element is determined based on a flow state of the water element.

Optionally, the input information is determined based on a target object recognized in an input image.

Optionally, the input information is determined based on a drawing operation by the user.

The image processing apparatus according to the embodiment of the present disclosure may perform the image processing method shown in the foregoing embodiments of the present disclosure, and the implementation principles thereof are similar, and thus are not repeated here.

In the embodiment of the present disclosure, input information is received. A first image of a fluid element in an initial state is generated. A flow state of the fluid element is determined based on the first image and a fluid simulation algorithm, to generate a second image. A stop state of the fluid element is determined based on the second image, to obtain a third image. The image processing is divided into three layers. The initial state, the flow state and the stop state of the fluid element are described separately, so that the simulation of flow and solidification of fluid is more realistic. In the field of simulation of ink painting, the simulation effect is more realistic and it is easy for users to learn.

Figure 6:
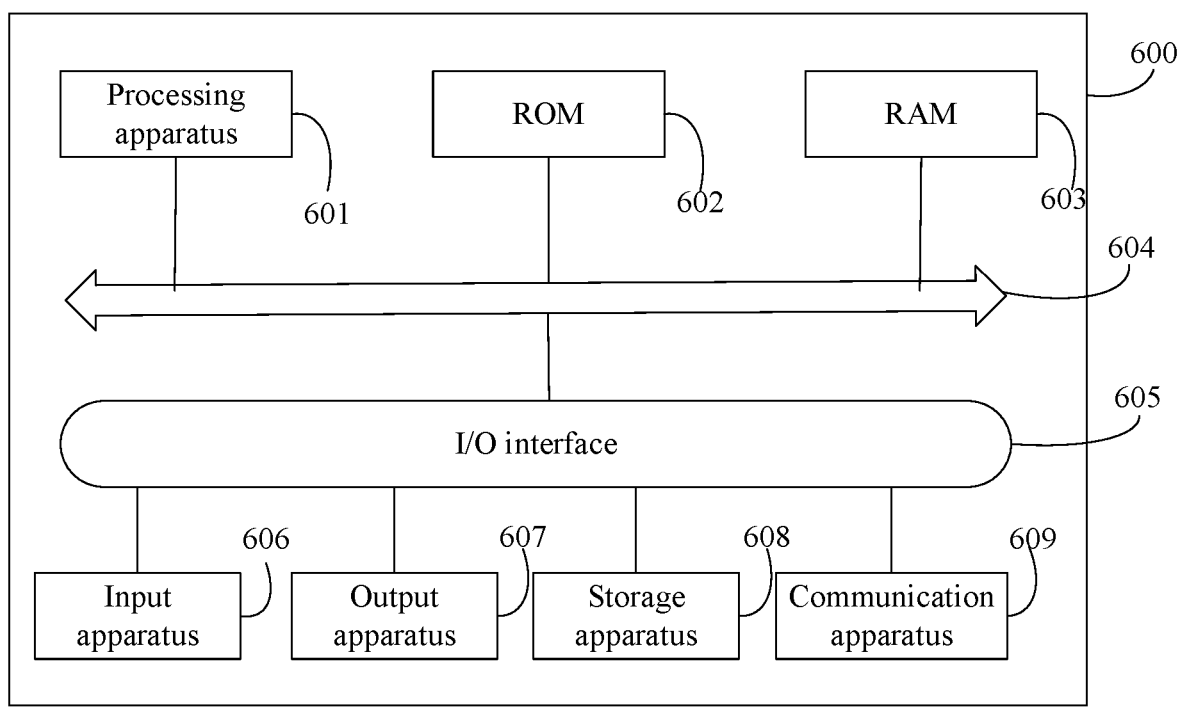
FIG. 6 is a schematic structural diagram illustrating an electronic device according to an embodiment of the present disclosure.

Reference is made to FIG. 6, which is a schematic structural diagram illustrating an electronic device 600 suitable for implementing an embodiment of the present disclosure. The terminal device in the embodiment of the present disclosure may include but is not limited to a mobile terminal such as a mobile phone, a notebook computer, a digital broadcast receiver, a PDA (Personal Digital Assistant), a PAD (Tablet Computer), a PMP (Portable Multimedia Player), and an in-vehicle terminal (e.g., in-vehicle navigation terminal), as well as a stationary terminal such as a digital TV, and a desktop computer. The electronic device shown in FIG. 6 is only an example, and should not limit the functions and application scope of the embodiments of the present disclosure.

The electronic device includes a memory and a processor. The processor here may be referred to as the processing apparatus 601 below. The memory may include at least one of a read only memory (ROM) 602, a random-access memory (RAM) 603, and a storage apparatus 608 hereinafter.

As shown in FIG. 6, the electronic device may include a processing apparatus (e.g., a central processing unit, a graphics processing unit, etc.) 601. The processing apparatus 601 may perform various appropriate actions and processing according to a program stored in the read only memory (ROM) 602 or a program loaded from the storage apparatus 608 into the random-access memory (RAM) 603. In the RAM 603, various programs and data necessary for the operation of the electronic device 600 are also stored. The processing apparatus 601, the ROM 602, and the RAM 603 are connected to each other via a bus 604. An input/output (I/O) interface 605 is also connected to the bus 604.

Generally, the following components may be connected to the I/O interface 605: an input apparatus 606 including, for example, a touch screen, a touch pad, a keyboard, a mouse, a camera, a microphone, an accelerometer, and a gyroscope; an output apparatus 607 including, for example, a liquid crystal display (LCD), a speaker and a vibrator; a storage apparatus 608 including, for example, a tape and a hard disk; and a communication apparatus 609. The communication apparatus 609 may allow the electronic apparatus 600 to communicate wirelessly or by wire with other apparatuses to exchange data. Although FIG. 6 shows the electronic apparatus having various apparatuses, it should be understood that not all of the illustrated apparatuses are necessarily implemented or provided. Instead, more or fewer apparatuses may be implemented or provided.

In particular, the processing described above with reference to the flowcharts may be implemented as computer software programs according to an embodiment of the present disclosure. For example, a computer program product is provided according to an embodiment of the present disclosure. The computer program product includes a computer program carried by a non-transitory computer readable medium. The computer program includes program code for performing the method shown in the flowcharts. In such embodiment, the computer program may be downloaded and installed from the network via the communication apparatus 609, or from the storage apparatus 608, or from the ROM 602. The computer program, when being executed by the processing apparatus 601, implements the functionalities defined in the method according to the embodiment of the present disclosure.

It should be noted that the computer readable medium according to the present disclosure may be a computer readable signal medium or a computer readable storage medium, or any combination of the above two. The computer readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. According to the present disclosure, the computer readable storage medium may be any tangible medium that contains or stores a program. The program may be used by or in conjunction with an instruction execution system, apparatus or device. In the present disclosure, the computer readable signal medium may include a data signal propagated in baseband or as part of a carrier wave with computer readable program code embodied thereon. The data signal propagated in this manner may be in various forms, including but not limited to an electromagnetic signal, an optical signal, or any suitable combination of the foregoing. The computer readable signal medium may also be any computer readable medium other than the computer readable storage medium. The computer readable signal medium may transmit, propagate, or transport the program for use by or in connection with the instruction execution system, apparatus, or device. The program code embodied on the computer readable medium may be transmitted over any suitable medium including, but not limited to, an electrical wire, an optical fiber cable, RF (radio frequency), or any suitable combination of the foregoing.

In some embodiments, the client terminal and the server may perform communications based on any currently known or future developed network protocol such as HTTP (Hypertext Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., the ad hoc peer-to-peer network), as well as any currently known or future developed networks.

The computer readable medium may be included in the electronic device, or may exist alone without being incorporated into the electronic device.

The computer readable medium carries one or more programs that, when being executed by the electronic device, cause the electronic device to: generate a first image of a fluid element in an initial state based on input information, where the initial state of the fluid element is determined based on the input information; determine, based on the first image and by using a fluid simulation algorithm, a flow state of the fluid element to obtain a second image; and determine, based on the second image, a stop state of the fluid element to obtain a third image.

The computer program code for performing operations according to the present disclosure may be written in one or more programming languages, or a combination thereof. Such programming languages include, but are not limited to, object-oriented programming languages, such as Java, Smalltalk, C++, and conventional procedural programming languages, such as the "C" language or similar programming languages. The program code may be executed entirely on a user computer, partly on a user computer, as a stand-alone software package, partly on a user computer and partly on a remote computer, or entirely on a remote computer or server. In the case of a remote computer, the remote computer may be connected to a user computer over any kind of network, including a local area network (LAN) or a wide area network (WAN), or may be connected to an external computer (e.g., over the Internet provided by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code. The module, segment, or portion of code contains one or more executable instructions for implementing the specified logical functionalities. It should be noted that, in some alternative implementations, the functionalities noted in the blocks may be performed in an order different from the order noted in the drawings. For example, two blocks shown in succession may in fact be performed concurrently or in reverse, depending upon the functionalities involved. It should further be noted that each block in the block diagrams and/or flowcharts and combinations of blocks in the block diagrams and/or flowcharts may be implemented by special purpose hardware-based systems that perform specified functionalities or operations, or by combinations of special purpose hardware and computer instructions.

The units involved in the embodiments of the present disclosure may be implemented in software or hardware.

The functionalities described herein above may be performed, at least in part, by one or more hardware logic components. For example, without limitation, illustrative hardware logic components that may be used include: Field Programmable Gate Array (FPGA), Application Specific Integrated Circuit (ASIC), Application Specific Standard Products (ASSP), Systems on Chip (SOC), Complex Programmable Logic Device (CPLD) and so on.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. More specific examples of the machine-readable storage medium may include: an electrical connection based on one or more wires, a portable computer disk, a hard disk, a random-access memory (RAM), a read only memory (ROM), an erasable programmable read only memory (EPROM or flash memory), a fiber optic cable, a portable compact disk read only memory (CD-ROM), an optical storage device, a magnetic storage device, or any suitable combination of the foregoing.

A method for drawing a painting based on user interaction is provided according to one or more embodiments of the present disclosure. The method includes:

generating a first image of a fluid element in an initial state based on input information, where the initial state of the fluid element is determined based on the input information;

determining, based on the first image and by using a fluid simulation algorithm, a flow state of the fluid element to obtain a second image; and determining, based on the second image, a stop state of the fluid element to obtain a third image.

Optionally, the fluid element includes a water element and/or an ink element, the stop state of the water element indicates that the water element evaporates completely, and the stop state of the ink element indicates that the ink element is solidified.

Optionally, the method further includes: synthesizing the first image, the second image and the third image, rendering the synthesized image and displaying the rendered image.

Optionally, the fluid simulation algorithm is a Lattice Boltzmann Equation.

Optionally, a lattice in the Lattice Boltzmann Equation has a resistance coefficient for flowing of the fluid element.

Optionally, an attribute value of the lattice in the Lattice Boltzmann algorithm is calculated based on a corrected flowing speed of the fluid element, the corrected flowing speed is obtained by correcting an average flowing speed of the fluid element based on a correction coefficient of the fluid element, and the correction coefficient is determined based on density of the fluid element.

Optionally, the greater the density of the fluid element, the greater the correction coefficient.

Optionally, the fluid element comprises a water element and an ink element, and the flow state of the ink element is determined based on the flow state of the water element.

Optionally, the input information is determined based on a target object recognized in an input image.

Optionally, the input information is determined based on a drawing operation by a user.

An image processing device is provided according to one or more embodiments of the present disclosure. The apparatus includes:

a first image generation module configured to generate a first image of a fluid element in an initial state based on input information, wherein the initial state of the fluid element is determined based on the input information;

the second image generation module is configured to determine, based on the first image and by using a fluid simulation algorithm, a flow state of the fluid element to obtain a second image; and a third image generation module configured to determine, based on the second image, a stop state of the fluid element to obtain a third image.

Optionally, the fluid element includes a water element and/or an ink element, the stop state of the water element indicates that the water element evaporates completely, and the stop state of the ink element indicates that the ink element is solidified.

Optionally, the apparatus further includes a display module, configured to synthesize the first image, the second image and the third image, render the synthesized image and display the rendered image.

Optionally, the fluid simulation algorithm is the Lattice Boltzmann Equation.

Optionally, a lattice in the Lattice Boltzmann Equation has a resistance coefficient for the flowing of the fluid element.

Optionally, an attribute value of the lattice in the Lattice Boltzmann algorithm is calculated based on a corrected flowing speed of the fluid element. The corrected flowing speed is obtained by correcting an average flowing speed of the fluid element based on a correction coefficient of the fluid element. The correction coefficient is determined based on density of the fluid element.

Optionally, the greater the density of the fluid element, the greater the correction coefficient.

Optionally, the fluid element includes a water element and an ink element, and a flow state of the ink element is determined based on a flow state of the water element.

Optionally, the input information is determined based on a target object recognized in an input image.

Optionally, the input information is determined based on a drawing operation by the user.

An electronic device is provided according to one or more embodiments of the present disclosure. The electronic device includes: one or more processors, a memory, and one or more application programs. The one or more application programs are stored in the memory and configured to be executed by the one or more processors to perform the method for drawing a painting based on user interaction.

A computer-readable storage medium is provided according to one or more embodiments of the present disclosure. The readable medium stores at least one instruction, at least one program, code set or instruction set. The at least one instruction, at least one program, code set or instruction set is loaded and executed by a processor to implement the image processing method.

The above description merely shows preferred embodiments according to the present disclosure and an illustration of the technical principles employed. Those skilled in the art should understand that the scope of disclosure involved in the present disclosure should cover other technical solutions formed by any combination of the above technical features or their equivalents without departing from the above disclosed concept, for example, a technical solution formed by replacing the above features with technical features (but not limited to) having functions similar to that disclosed in the present disclosure, rather than being limited to the technical solutions formed by the specific combination of the above technical features.

Additionally, although operations are illustrated in a particular order, the operations should not be construed as being performed in the particular order shown or in a sequential order necessarily. Under certain circumstances, multitasking and parallel processing may be advantageous. Likewise, the several implementation-specific details discussed above should not be construed as limitations on the scope of the present disclosure. Some features that are described in the context of separate embodiments may also be implemented in combination in a single embodiment. Alternatively, various features that are described in the context of a single embodiment may also be implemented in multiple embodiments separately or in any suitable sub-combination.

Although the subject matter has been described in languages specific to structural features and/or logical acts of method, it should understand that the subject matter defined in the appended claims is unnecessarily limited to the specific features or acts described above. Instead, the features and acts described above are merely example forms of implementing the claims.

What is claimed is:

1. An image processing method, comprising:
generating a first image of a fluid element in an initial state based on input information, wherein the initial state of the fluid element is determined based on the input information;
determining, based on the first image and by using a fluid simulation algorithm, a flow state of the fluid element to obtain a second image;
determining, based on the second image, a stop state of the fluid element to obtain a third image;
wherein the fluid simulation algorithm is a Lattice Boltzmann Equation;
wherein an attribute value of the lattice in the Lattice Boltzmann algorithm is calculated based on a corrected flowing speed of the fluid element, the corrected flowing speed is obtained by correcting an average flowing speed of the fluid element based on a correction coefficient of the fluid element, and the correction coefficient is determined based on density of the fluid element; and
a calculation method of the correction coefficient is as follows:
comparing twice the density of the fluid element with 1, and determining a minimum value between twice the density of the fluid element and 1;
comparing the minimum value with 0, and determining a maximum value between the minimum value and 0;
squaring the maximum value to obtain a square value;
subtracting twice the maximum value from 3 to obtain a difference;
multiplying the difference by the square value to obtain the correction coefficient.

2. The method according to claim 1, wherein the fluid element comprises a water element and/or an ink element, the stop state of the water element indicates that the water element evaporates completely, and the stop state of the ink element indicates that the ink element is solidified.

3. The method according to claim 1, further comprising: synthesizing the first image, the second image and the third image, rendering the synthesized image and displaying the rendered image.

4. The method according to claim 1, wherein the lattice in the Lattice Boltzmann Equation has a resistance coefficient for flowing of the fluid element.

5. The method according to claim 1, wherein the greater the density of the fluid element, the greater the correction coefficient.

6. The method according to claim 2, wherein the fluid element comprises the water element and the ink element, and the flow state of the ink element is determined based on the flow state of the water element.

7. The method according to claim 1, wherein the input information is determined based on a target object recognized in an input image.

8. The method according to claim 1, wherein the input information is determined based on a drawing operation by a user.

9. An image processing apparatus, comprising:
at least one processor; and
at least one memory communicatively coupled to the at least one processor and storing instructions that upon execution by the at least one processor cause the apparatus to:
generate a first image of a fluid element in an initial state based on input information, wherein the initial state of the fluid element is determined based on the input information;
determine, based on the first image and by using a fluid simulation algorithm, a flow state of the fluid element to obtain a second image;
determine, based on the second image, a stop state of the fluid element to obtain a third image;
wherein the fluid simulation algorithm is a Lattice Boltzmann Equation;
wherein an attribute value of the lattice in the Lattice Boltzmann algorithm is calculated based on a corrected flowing speed of the fluid element, the corrected flowing speed is obtained by correcting an average flowing speed of the fluid element based on a correction coefficient of the fluid element, and the correction coefficient is determined based on density of the fluid element; and
a calculation method of the correction coefficient is as follows:
comparing twice the density of the fluid element with 1, and determining a minimum value between twice the density of the fluid element and 1;
comparing the minimum value with 0, and determining a maximum value between the minimum value and 0;
squaring the maximum value to obtain a square value;
subtracting twice the maximum value from 3 to obtain a difference;
multiplying the difference by the square value to obtain the correction coefficient.

10. A computer-readable non-transitory medium,
bearing computer-readable instructions that upon execution on a computing device cause the computing device at least to:
generate a first image of a fluid element in an initial state based on input information, wherein the initial state of the fluid element is determined based on the input information;
determine, based on the first image and by using a fluid simulation algorithm, a flow state of the fluid element to obtain a second image;
determine, based on the second image, a stop state of the fluid element to obtain a third image;
wherein the fluid simulation algorithm is a Lattice Boltzmann Equation;
wherein an attribute value of the lattice in the Lattice Boltzmann algorithm is calculated based on a corrected flowing speed of the fluid element, the corrected flowing speed is obtained by correcting an average flowing speed of the fluid element based on a correction coefficient of the fluid element, and the correction coefficient is determined based on density of the fluid element; and
a calculation method of the correction coefficient is as follows:
comparing twice the density of the fluid element with 1, and determining a minimum value between twice the density of the fluid element and 1;
comparing the minimum value with 0, and determining a maximum value between the minimum value and 0;
squaring the maximum value to obtain a square value;
subtracting twice the maximum value from 3 to obtain a difference;
multiplying the difference by the square value to obtain the correction coefficient.

11. The apparatus of claim 9, wherein the fluid element comprises a water element and/or an ink element, the stop state of the water element indicates that the water element evaporates completely, and the stop state of the ink element indicates that the ink element is solidified.

12. The apparatus of claim 9, the at least one memory further storing instructions that upon execution by the at least one processor cause the apparatus to:
synthesize the first image, the second image and the third image, rendering the synthesized image and displaying the rendered image.

13. The apparatus of claim 9, wherein the lattice in the Lattice Boltzmann Equation has a resistance coefficient for flowing of the fluid element.

14. The apparatus of claim 9, wherein the greater the density of the fluid element, the greater the correction coefficient.

15. The apparatus of claim 11, wherein the fluid element comprises the water element and the ink element, and the flow state of the ink element is determined based on the flow state of the water element.

16. The apparatus of claim 9, wherein the input information is determined based on a target object recognized in an input image.

* * * * *